United States Patent [19]

Linderman et al.

[11] Patent Number: 4,714,237

[45] Date of Patent: Dec. 22, 1987

[54] SOFT SEAT FOR METERING VALVE

[75] Inventors: Ray D. Linderman, Streetsboro; Peter C. Williams, Cleveland Heights, both of Ohio

[73] Assignee: Whitey Co., Highland Hts., Ohio

[21] Appl. No.: 863,598

[22] Filed: May 14, 1986

[51] Int. Cl.$^4$ .............................................. F16K 1/42
[52] U.S. Cl. .................................. 251/330; 251/362; 251/120
[58] Field of Search ............... 251/362, 330, 361, 118, 251/120; 137/625.37

[56] References Cited

U.S. PATENT DOCUMENTS

| | | | |
|---|---|---|---|
| 386,647 | 7/1888 | Miller | 251/330 X |
| 1,024,751 | 4/1912 | Stewart . | |
| 1,273,931 | 7/1918 | Schild . | |
| 1,485,541 | 3/1924 | Waycott . | |
| 2,014,483 | 9/1935 | Price et al. . | |
| 2,692,750 | 10/1954 | Davis, Jr. et al. . | |
| 2,915,087 | 12/1959 | Kruschik . | |
| 2,924,421 | 2/1960 | Pohndorf . | |
| 2,994,343 | 8/1961 | Banks | 251/362 X |
| 3,044,743 | 7/1962 | Siegel . | |
| 3,144,042 | 8/1964 | Glauber | 251/361 X |
| 3,153,421 | 10/1964 | Webster . | |
| 3,228,655 | 1/1966 | Weise . | |
| 3,233,863 | 2/1966 | Bowen et al. . | |
| 3,263,961 | 8/1966 | Varga . | |
| 3,269,698 | 8/1966 | Koch | 251/330 X |
| 3,428,076 | 2/1969 | Lowe . | |
| 3,548,869 | 12/1970 | Weise et al. . | |
| 3,620,251 | 11/1971 | Bowen . | |
| 3,761,052 | 9/1973 | Tobbe et al. . | |
| 3,767,159 | 10/1973 | Treul . | |
| 4,129,284 | 12/1978 | Scapes et al. . | |
| 4,431,021 | 2/1984 | Scaramucci . | |

FOREIGN PATENT DOCUMENTS 1037395 of 1966 United Kingdom .

*Primary Examiner*—Arnold Rosenthal
*Attorney, Agent, or Firm*—Fay, Sharpe, Beall, Fagan, Minnich & McKee

[57] ABSTRACT

A metering valve for selectively regulating fluid flow between inlet and outlet passages. The metering valve includes threadedly interconnected bonnet and valve stem members received in a valve chamber with the stem being selectively movable axially relative to a valve seat. A seat insert is interposed between the bonnet member and valve seat for sealing cooperation with the valve stem. The seat insert includes an annular base portion having an aperture extending therethrough for communication with the inlet passage. Leg portions extend axially outward from the base portion at peripherally spaced apart intervals for abutting engagement with the bonnet member. The leg portions are disposed radially inward from an outer periphery of the base portion, and each leg portion has a predetermined peripheral width dimension less than the cross-sectional dimension of the outlet passage for allowing fluid flow therearound in all orientations of the insert in the valve chamber.

2 Claims, 4 Drawing Figures

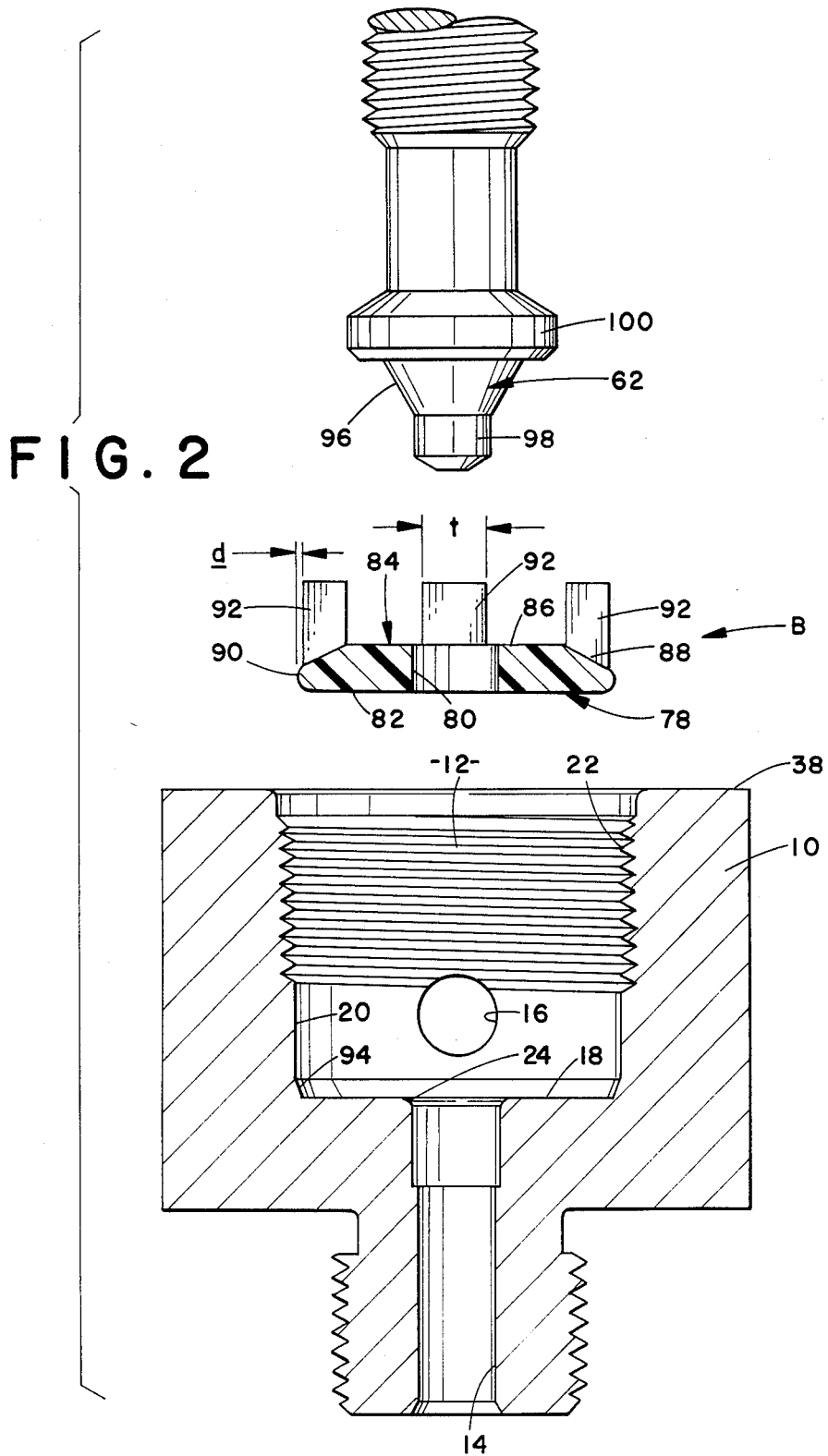

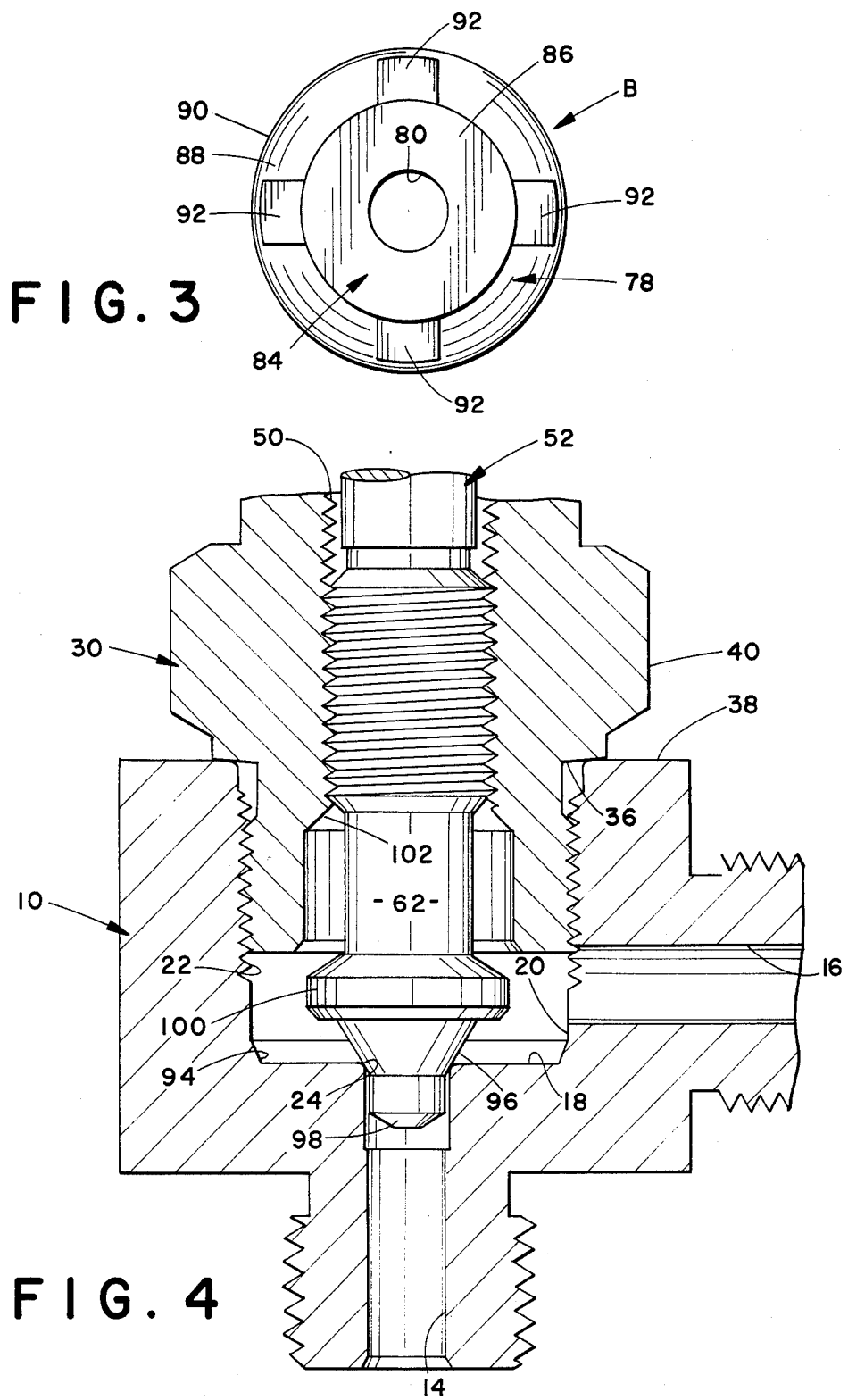

SOFT SEAT FOR METERING VALVE

BACKGROUND OF THE INVENTION

This invention pertains to the art of valves and more particularly to metering valves.

The invention is particularly applicable to a new and improved soft seat assembly for a metering valve and will be described with particular reference thereto. However, it will be appreciated that the invention has broader implications and may be advantageously employed in other valve environments and applications.

Previous metering valve arrangements, have typically provided sealing engagement between the lower end of a valve stem and a metallic valve seat defined on a generally planar surface of a valve chamber. Although the durable metal to metal contact between the stem and seat provides adequate sealing for many applications, the seat or an abutment area on the valve stem is eventually subject to wear and degradation with continued use over time. Irregularities that develop between the mating metal surfaces of the stem and seat inhibit precise sealing efforts.

More recent developments have attempted to employ a soft seat that is designed for mating, sealing contact with the valve stem. U.S. Pat. No. 3,228,655 to Weise issued Jan. 11, 1966 is representative of one type of valve assembly incorporating a soft seat. The Weise patent particularly teaches a two-piece structure defining a substitute seat surface comprising, alternatively, a soft seat or hard seat. The substitute seat is suitable for modifying an original valve assembly in which a metal seat surface has become pitted and worn. Further, the substitute seat is received in the valve assembly without having to change or modify any of the remaining valve components.

The substitute seat in the above-noted patent necessarily requires a two-piece construction which is subject to further problems. Multi-part components require separate manufacture, tolerance specifications, inventory, and, additionally, are prone to deleterious wear between the cooperating members. Moreover, any movement of the substitute seat either during assembly or use, has an adverse effect on the metering function and resultant flow through the valve.

The present invention contemplates a new and improved seat assembly which allows all of the benefits of the prior construction to be realized while eliminating the above-referred to problems and others.

SUMMARY OF THE INVENTION

According to the present invention, an economical and reliable metering valve construction which incorporates a soft seat construction is provided.

In accordance with one aspect of the invention, the metering valve includes a valve body having first and second passages communicating with a valve chamber formed therein. A bonnet member and valve stem are received in the valve chamber, and the stem is mounted for selective advancement and retraction relative to a valve seat disposed in the valve chamber intermediate the first and second passages. A seat insert interposed between the valve stem and seat includes a base portion having an aperture extending therethrough for fluid communication with the first passage. The base portion includes a tapering outer wall portion adjacent the radial outer peripheral edge to facilitate fluid flow therepassed to the second passage. The seat insert further includes plural leg portions extending axially outward from the tapering wall portion for abutting engagement with the bonnet member. Each leg portion is disposed radially inward from the outer periphery of the base portion to enhance fluid flow therearound.

According to another aspect of the invention, each leg portion has a predetermined peripheral width dimension which is less than the cross-sectional dimension of the second passage. This arrangement assures fluid flow to the second passage regardless of the orientation of the seat insert in the valve chamber.

According to yet another aspect of the invention, the valve stem includes a generally frusto-conical portion adapted for annular band contact with the soft seat insert. Alternatively, the valve components are dimensioned so that the stem frusto-conical portion is adapted for abutting engagement directly with the valve seat in the absence of the seat insert.

The principal advantage of the invention is the provision of a metering valve having a unitary seat insert for enhancing sealability.

Another advantage of the invention resides in the total encapsulation of the seat insert in the valve chamber.

Yet another advantage is found in the improved flow paths defined around leg portions of the seat insert for establishing free fluid flow between the first and second passages.

Still other advantages and benefits of the invention will become apparent to those skilled in the art upon a reading and understanding of the following detailed description.

BRIEF DESCRIPTON OF THE DRAWINGS

The invention may take physical form in certain parts and arrangements of parts, a preferred embodiment of which will be described in detail in this specification and illustrated in the accompanying drawings which form a part hereof, and wherein:

FIG. 2 is an enlarged, exploded detail of the lower portion of the valve stem, the seat insert, and the valve chamber;

FIG. 3 is a plan view of the subject new seat insert; and,

FIG. 4 is a cross-sectional view of the lower portion of the new metering valve in a closed position showing the manner of valve sealing in the absence of the seat insert.

DETAILED DESCRIPTION OF THE PRFERRED EMBODIMENT

Figure 1:
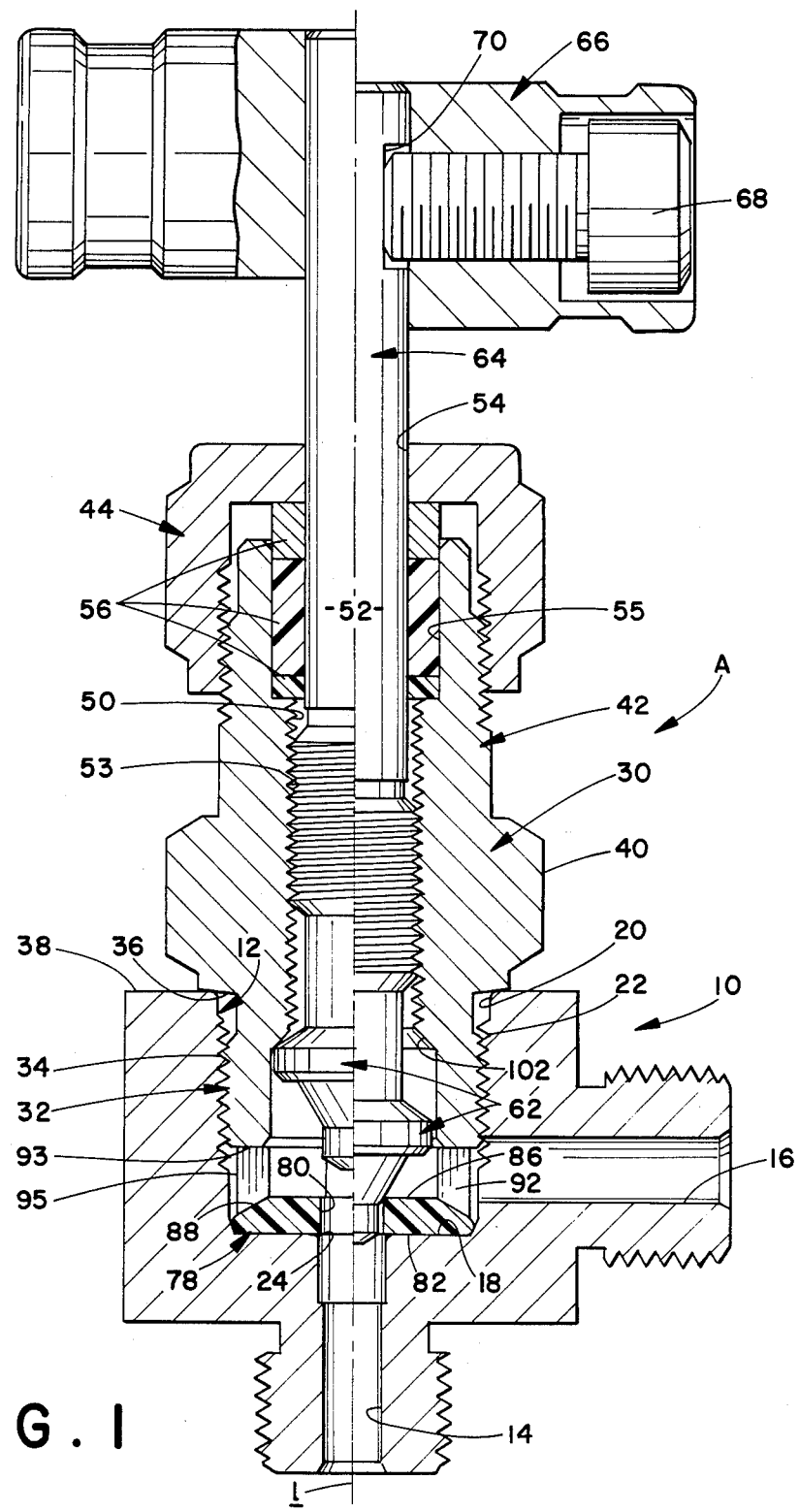
FIG. 1 is a cross-sectional view of the assembled metering valve formed in accordance with the invention illustrating both open and closed positions of the valve stem.

Referring now to the drawings wherein the showings are for purposes of illustrating the preferred embodiment only and not for purposes of limiting same, FIG. 1 shows an assembled metering valve A having a valve body 10 which may be used in a valve manifold environment or in other types of valve assemblies. The body includes a valve chamber 12 that communicates with a first or inlet passage 14 and a second or outlet passage 16, although the inlet and outlet passages may be reversed in certain applications. As shown, the first passage coaxially communicates with valve chamber 12 at a radially disposed chamber inner end wall or shoulder 18. The valve chamber further includes a generally cylindrical sidewall 20 having a threaded portion 22 spaced from end wall 18 adapted to receive a valve bonnet member therein. A valve seat 24 is defined generally at the area of intersection between the valve end wall and the first passage 14.

A valve bonnet member 30 includes a first or inner end 32 cooperatively received in the valve chamber. Specifically, threaded exterior portion 34 adjacent the bonnet inner end engages threaded portion 22 of the valve chamber. A generally radially extending shoulder 36 is brought into abutting engagement with an outer surface 38 of the valve body for positively defining innermost receipt of the bonnet member in the chamber. The advantageous function provided by the abutting relation will be described in greater detail hereinbelow. Means to facilitate ease of threaded insertion of the bonnet member 30 into the valve chamber may be provided, e.g., wrench flats 40 or the like, on an exterior surface of the bonnet member. A second or outer end 42 of the bonnet member is structured to threadedly receive a bonnet nut 44 thereon.

An elongated opening or bore 50 extends axially through the bonnet member and is adapted to threadedly receive a valve stem 52 as at 53 over an axial or longitudinal extent of the stem. Similarly, an opening 54 is provided in the outer end wall of the bonnet nut allowing outward passage of the valve stem therethrough. Suitable packing means generally designated 56 is interposed between the valve stem exterior surface and an enlarged area 55 of the bore 50 adjacent the outer end 42 of the bonnet member. The packing means is of a conventional, known type and prevents fluid in the valve chamber from exiting the valve around the stem. As is also known, the packing means is axially dimensioned so that advancement of the bonnet nut onto the bonnet member axially and radially compresses the packing means into increased or more positive sealing engagement between the valve stem and bonnet member. Since packing means of this type are known in the art and since the details thereof do not form part of the present invention, a further detailed description thereof is deemed unnecessary.

The valve stem 52 includes a first or inner stem tip end 62 disposed in the valve chamber 12 for selective regulation of fluid flow between the first and second passages 14, 16. The valve stem further includes a second or outer end 64 having convenient actuating means such as handle 66 disposed thereon. In the preferred embodiment shown in FIG. 1, the handle includes cap screw means 68 extending into engagement with a flat 70 on the valve stem for maintaining the handle in nonrotative relationship therewith. Therefore, manual rotation imparted to the handle, in turn, rotates the valve stem relative to the bonnet and the threaded engagement between these members at area 53 provides axial advancement and retraction of the stem in the valve chamber as is well known in the art.

With continued reference to FIG. 1, and with reference now also to FIGS. 2 and 3, the subject metering valve further includes a seat insert B. Preferably, the seat insert includes an annular base portion 78 having a central opening 80 therethrough. The opening 80 is located to be concentrically aligned with the inlet passage 14 and the stem axis 1. The base portion further includes a first or inner surface 82 adapted for a facing, close mating relationship with valve chamber inner end wall 18. A second or outer surface 84 of the base is generally spaced from the first surface and is comprised of two components. That is, the surface 84 has a centrally disposed, generally planar portion 86 and a tapering, radially outer band-like portion 88 interposed between planar portion 86 and an outer peripheral or circumferential surface 90. The tapering band-like portion 88 forms an enlarged diameter flow passageway to better facilitate fluid flow from the inlet to the outlet passage as will become more apparent hereinbelow.

A pluralality of circumferentially spaced apart leg portions 92 extend generally axially outward from the outer surface 84 of the seat insert at the area of the tapering surface portion 88. The leg portions have a length or axial dimension which is sufficient for allowing the outer free ends thereof to be abuttingly engaged as at 93 by the innermost portion of bonnet member inner end 32. Such relationship securely retains the seat insert against rotational and axial movement in the valve chamber with inner surface 82 of the insert base portion in close engaging relation with valve chamber end wall 18. Further, the base portion is dimensioned and configured so that the outer peripheral surface 90 of the base portion is closely received by the chamber sidewall 20. In the preferred embodiment, a chamfered zone 94 defines the area of interface between the chamber side and end walls. Close receipt of the seat insert in the valve chamber in the manner described provided total encapsulation to potentially eliminate movement of the insert B.

The leg portions 92 are typically equiangularly spaced apart around the insert outer surface 84, and four such legs 92 are contemplated in the preferred embodiment here under discussion. However, it will be appreciated that a greater or lesser number of legs could also be used as deemed necessary and/or appropriate. Additionally, the leg portions are spaced radially inward by some predetermined dimension d from the outer peripheral surface 90 of the base portion. This radial spacing provides an annular gap 95 (FIG. 1) between the outer surfaces of the leg portions and the valve chamber sidewall 20 so that fluid may freely flow therearound. Similarly, the leg portions 92 are spaced radially outward from the central opening 80 by a distance which is adequate to prevent any interference with the valve stem 52.

With particular reference to FIG. 2, the leg portions 92 have predetermined peripheral or width dimensions t which are less than the cross-sectional dimension of the outlet passage 16. In this manner, fluid may freely flow therearound to the annular gap 95 and, eventually, to the outlet passage 16. This dimensional relationship advantageously dispenses with any necessity for any particular rotational alignment of the seat insert in the valve chamber. During assembly, the seat insert may be placed in the chamber without regard to the relative positioning between the leg portions and outlet passage 16. Even if one of the leg portions is situated directly in front of the outlet passage, the flow of fluid is in no way hampered since the leg portions all have a peripheral or width dimension which is less than the cross-sectional dimension of the outlet passage.

The seat insert B is formed of a non-metallic material such as a plastic. Preferred examples of suitable materials include HALAR, a trademark of Allied Corporation, a New York corporation DELRIN, a trademark of E. I. DuPont de Nemours and Company, a Delaware corporation, and TEFLON, also a trademark of E. I. DuPont de Nemours and Company, although it is readily apparent that other materials exhibiting similar properties may be used with equal success. The plastic construction defines a so-called "soft" seat insert in comparison to the "hard" metallic seat 24. Radial and axial encapsulation of the seat insert as described positively maintains the seat insert positioned between the valve seat 24 and the bonnet member 30. Gross deformation of the seat insert is successfully avoided by this total encapsulation.

A radially outward extending frusto-conical portion 96 is provided on the stem inner end 62 for sealing engagement with the set insert. Since the seat insert is formed of a soft material, annular band contact between the frusto-conical portion 96 and the seat insert is possible. A stem throttling portion 98 extends axially outward from the frusto-conical portion for receipt in the inlet passage 14 during valve closure. Further, a radially extending flange 100 is advantageously provided adjacent the large diameter end of frusto-conical portion 96. The flange and an interior chamfered surface 102 on the bonnet member cooperate to define a positive stop means for limiting opening movement of the valve stem.

The metering valve A incorporating the soft seat insert enhances the life of the valve. The valve stem frusto-conical portion advantageously seals with either the metal seat 24 or the seat insert B for regulating fluid flow between the inlet and outlet passages. Additionally, the leg portions of the seat insert allow total encapsulation of the insert without any adverse affect on fluid flow.

If the seat insert is removed for maintenance or replacement, the remaining portions of the metering valve are unaffected. In other words, the bonnet member is designed to abuttingly engage the valve body outer surface 38 along radial shoulder 36 with or without the presence of a seat insert in the valve chamber. Only the extent of axial advancement of the valve stem is altered, and this movement is accommodated by predetermined design characteristics incorporated into the cooperating stem and valve bonnet threaded portions. With reference to FIG. 4, the subject new metering valve is shown with the seat insert B removed therefrom. It is apparent that the frusto-conical portion 96 is designed for metal-to-metal abutting contact with the valve seat 24. Thus, regulation of fluid flow between the inlet and outlet passages can proceed satisfactorily in the absence of the seat insert. Sufficient axial advancement capability of the valve stem into the chamber is provided so that appropriate contact between the stem and valve seat may be readily achieved.

The invention has been described with reference to the preferred embodiment. Obviously, modifications and alterations will occur to others upon a reading and understanding of this specification. It is intended to include all such modifications and alterations insofar as they come within the scope of the appeneded claims or the equivalents thereof.

Having thus described the invention, it is now claimed:

1. A metering valve comprising:
   a valve body having a valve chamber and first and second passages communicating therewith on opposite sides of a valve seat in said valve chamber, said first passage extending through an end wall of said chamber and said second passsage extending through a sidewall thereof;
   a bonnet member operatively associated with said valve chamber at an open area spaced from said end wall;
   an annular unitary, non-metallic seat insert closely received in said valve chamber, said seat insert including:
   a base portion having a first surface in mating relation with said end wall and a second surface generally parallel and spaced from said first surface, said base portion also having an aperture extending therethrough for generally coaxial communication with said first passage, said base portion first surface including a generally planar annular region surrounding said aperture and a radially tapering surface portion extending axially from said planar annular region toward said second surface at an outer periphery of said base portion,
   plural leg portions extending outwardly from said tapering surface portion generally axially of said seat insert for abutting engagement with and axial encapsulation by said bonnet member such that said seat insert is secured against rotational and axial movement in said valve chamber, said leg portions being disposed radially inward from said base portion outer periphery and having a predetermined peripheral width dimension less than the cross-sectional dimension of said second passage to facilitate fluid flow between said passages in any rotated position of said seat insert in said valve chamber; and,
   a valve stem operatively received through said bonnet member for selective advancement and retraction relative to said valve seat, said valve stem having an axial length such that advancement of said valve stem toward said valve seat in the absence of said seat insert provides abutting sealing engagement between said valve stem and valve seat.

2. A metering valve comprising:
   a valve body having an opening defining a valve chamber, first and second passages communicating with said valve chamber and a valve seat interposed between said first and second passages along a valve chamber end wall;
   a bonnet member received in said valve body opening and having a central bore therethrough operatively receiving a valve stem for reciprocal movement relative to said valve seat;
   said valve stem including a stem tip at one end and actuating means operatively disposed at the other end adapting said stem for selective reciprocal movement relative to said valve seat, said stem including a flange extending radially outward at an area axially spaced from said stem tip for defining a valve stem stop means and limiting stem axial movement, and a generally radially outward extending frusto-conical portion intermediate said stem tip and flange; and,
   a unitary, non-metallic seat insert interposed between said bonnet member one end and said end wall, said seat insert including:
   a base portion having an aperture extending therethrough between first and second surfaces, said aperture concentrically disposed relative to said inlet passage, said first surface including an annular generally planar region extending radially outward from said aperture and a tapering surface portion radially interposed between said planar region and extending axially toward an outer periphery of said base portion adjacent said second surface, plural leg portions extending axially outward from said tapering surface portion for abutting engagement with said bonnet member one end such that said seat insert is secured against rotational and axial movement in said valve chamber, said leg portions disposed radially inward a dimension t from the base portion outer periphery and having a predetermined peripheral dimension d less than the cross-sectional dimension of said outlet passage whereby fluid can flow therearound to said second passage.

* * * * *